(12) United States Patent
Tews (10) Patent No.: US 6,250,617 B1
(45) Date of Patent: Jun. 26, 2001

(54) SHOCK ATTENUATING APPARATUS (75) Inventor: Kevin B. Tews, Lansing, IL (US)

(73) Assignee: Miner Enterprises, Inc., Geneva, IL (US)

( * ) Notice: Subject to any disclaimer, the term of this patent is extended or adjusted under 35 U.S.C. 154(b) by 0 days.

(21) Appl. No.: 09/232,724

(22) Filed: Jan. 19, 1999

(51) Int. Cl.$^7$ .................................................. F16F 1/36
(52) U.S. Cl. .............................. 267/153; 267/141; 213/7
(58) Field of Search .................................. 267/153, 141, 267/292, 293, 294; 213/7, 40 R, 44

(56) References Cited

U.S. PATENT DOCUMENTS

| | | | |
|---|---|---|---|
| 2,713,483 | 7/1955 | Tillou | 267/1 |
| 3,202,412 | 8/1965 | Trask | 267/1 |
| 3,315,951 | 4/1967 | Boschi et al. | 267/1 |
| 3,409,284 | 11/1968 | Rix | 267/1 |
| 3,434,708 | 3/1969 | Hawk, Jr. | 267/63 |
| 3,606,295 * | 9/1971 | Appleton | 213/40 R |
| 3,845,021 * | 10/1974 | Dukes et al. | 213/7 |
| 3,929,729 * | 12/1975 | Chung | 260/75 NH |
| 4,073,858 * | 2/1978 | Chung | 264/262 |
| 4,198,037 | 4/1980 | Anderson | 267/153 |
| 4,235,426 * | 11/1980 | Sullivan, Jr. et al. | 267/8 R |
| 4,445,674 * | 5/1984 | Clayton, Jr. | 267/141 |
| 4,566,678 | 1/1986 | Anderson | 267/141.1 |
| 5,092,567 * | 3/1992 | Wang | 267/141 |
| 5,141,697 | 8/1992 | Wydra | 264/320 |
| 5,192,057 | 3/1993 | Wydra et al. | 267/153 |
| 5,240,269 * | 8/1993 | Kerr | 280/285 |
| 5,280,890 | 1/1994 | Wydra | 267/220 |
| 5,326,083 | 7/1994 | Wydra et al. | 267/139 |
| 5,351,844 * | 10/1994 | Carlstedt | 213/44 |
| 5,364,086 | 11/1994 | Paton | 267/140.4 |
| 5,460,357 | 10/1995 | Stewart | 267/294 |
| 5,868,384 * | 2/1999 | Anderson | 267/141.1 |
| 5,957,441 * | 9/1999 | Tews | 267/153 |

\* cited by examiner

*Primary Examiner*—Christopher P. Schwartz
*Assistant Examiner*—Xuan Lan Nguyen
(74) *Attorney, Agent, or Firm*—John W. Harbst

(57) ABSTRACT

A compressible spring or shock attenuating apparatus is disclosed for axial insertion within an elongated hollow receptacle having a predetermined inner diameter. The compressible spring of the present invention comprises an elastomer body having an outer diameter and a pair of axially spaced ends. A series of substantially equal annular crests are axially disposed relative to each other on the elastomer body between the spaced ends, with a periphery of the crests defining an outer diameter for the elastomer body. The elastomer body is specifically configured such that the outer diameter of the elastomer body remains substantially constant even when the ends of the spring are compressed toward each other. According to the present invention, each crest of the elastomer body has a closed annular ring fixed and extending thereabout to promote maintaining the outer diameter of said body substantially constant as the ends move toward each other while defining a predetermined outer diameter for the spring. The predetermined outer diameter of the spring is greater than the outer diameter of the elastomer body and is sized to the inner diameter of the receptacle whereby the rings promote axial movements and inhibit snaking movements of said spring within the receptacle.

24 Claims, 5 Drawing Sheets

SHOCK ATTENUATING APPARATUS

FIELD OF THE INVENTION

The present invention generally relates to a shock attenuating or absorbing apparatus and, more particularly, to an elastomeric compression spring which dissipates energy of an applied load or impact force, with the principals of the present invention being equally applicable to a wide variety of devices ranging from bicycles and motorcycles to draft gears for railroad cars.

BACKGROUND OF THE INVENTION

Shock-absorbing devices are used in a wide variety of applications. For example, shock absorbing units have long been utilized in bicycles and motorcycles. Most modem bicycles and motorcycles embody some form of a shock-absorbing suspension system in front and rear fork assemblies and other body parts such as seat support structure for dampening the effects road irregularities impart to the rider. Another example where shock absorbing devices are commonly used involves draft gears at opposed ends of railroad cars. As well known, railroad car draft gears embody shock absorbing technology to lessen the effects impacting railroad cars have on one another.

Shock attenuating or absorbing devices typically embody a resilient member of a material having the property of self-restoration, namely restoring itself to the condition it had prior to its distortion by the application of an impact force or load thereto. One type of material having the property of self-restoration is an elastomer which has been widely used as both a tension and compression spring.

Present designs of mountain bicycles and off-road bicycles have telescopic front fork suspension systems which typically use a microcellular urethane material encapsulated within a cylindrical unit for absorbing energy or impacts as the bicycle traverses uneven or bumpy terrain. These designs, however, present problems because urethane type materials tend to absorb moisture thereby effecting their proper functioning, lack integrity and durability due to flaking, and have a spring rate that imposes the additional cost of a dampener upon the manufacturer of such suspension systems.

One of the more recent elastomers revealing promising results as a spring is a copolyester polymer. As disclosed in U.S. Pat. Nos. 4,198,037 and 4,566,678 to David G. Anderson and assigned to the assignee of the present application, thermoplastic elastomers have been widely used for the manufacture of compression springs. One such polymer is sold by DuPont & Co. under the tradename HYTREL.

Generally, this type of polymer elastomer material has inherent physical properties which make it unsuitable for use as a compression spring. As disclosed in the above-listed patents, however, applicant's assignee has advantageously discovered a method whereby copolyester polymer elastomer material can be processed to render the material usable for the manufacture of compression springs.

Thermoplastic polymer elastomer material has advantageously been used as a compression spring in railroad car draft gears. As will be appreciated by those skilled in the art, a railroad car draft gear typically includes a hollow housing or receptacle defining a blind cavity. The compression or shock-absorbing portion of the draft gear includes an elastomeric body including a series of axially spaced generally flat metals discs or plates axially inserted into the cavity. An end cap is arranged in operative combination with the compression spring and axially extends from the receptacle. As is well known, and during use on the railroad car, the end cap telescopically moves relative to the receptacle thereby compressing the shock-absorbing device therebetween by moving opposite ends of the shock-absorbing device toward each other resulting in the absorption of the energy or impact imparted thereto. Of course, after the impact or load is removed, the shock-absorbing device expands and automatically functions to return the end cap to a predetermined disposition relative to the receptacle.

Regardless of the particular application, elastomeric springs require a substantial space around it for the necessary lateral or radial expansion when the spring is compressed. Unfortunately, and as described above, such free space is not always available in practice. As will be appreciated by those skilled in the art, when the elastomeric spring is disposed in a tube or receptacle, radial expansion or bulging of the elastomeric spring, resulting from axial compression thereof, causes the periphery of the elastomeric spring to press against an inside diameter of the tube or receptacle which may result in stiction and an increased spring rate. Of course, stiction or an increased spring rate can easily and readily lead to twisting or snaking of the elastomeric spring within the tube or receptacle. Moreover, and as a result of axial compression under load, if any lengthwise portion of the elastomeric spring should radially expand or bulge outwardly beyond a predetermined limit, the tube or receptacle will tend to wear on the periphery of the elastomeric spring, thus, creating additional problems.

Thus, there is a need and a desire for an elastomeric shock attenuating apparatus or compression spring which is configured for use within tight space constraints as realized in a wide variety of applications such as bicycle suspension systems or railroad car draft gears and wherein the attenuating apparatus or spring eliminates the above-mentioned disadvantages while enhancing guidance and axial movements of the spring within a tube or receptacle on the bicycle suspension system or railroad car draft gear.

SUMMARY OF THE INVENTION

In view of the above, and in accordance with the present invention, there is provided a compressible spring or shock attenuating apparatus for axial insertion within an elongated hollow receptacle having a predetermined inner diameter. The compressible spring of the present invention comprises an elastomer body having an outer diameter and a pair of axially spaced ends. A series of substantially equal annular crests are axially disposed relative to each other on the elastomer body between the spaced ends, with a periphery of the crests defining an outer diameter for the elastomer body. The elastomer body is specifically configured such that the outer diameter of the elastomer body remains substantially constant even when the ends of the spring are compressed toward each other. According to the present invention, each crest of the elastomer body has a closed annular ring fixed and extending thereabout to promote maintaining the outer diameter of said body substantially constant as the ends move toward each other while defining a predetermined outer diameter for the spring. The predetermined outer diameter of the spring is greater than the outer diameter of the elastomer body and is sized to the inner diameter of said receptacle whereby the rings promote axial movements and inhibit snaking movements of the spring within the receptacle.

In a preferred form of the invention, each ring is connected to a crest of the elastomer body thereby inhibiting shifting movements of the rings relative to the elastomer body in response to axial movements of the spring within the receptacle. To further promote axial movements of the spring within the tube or receptacle, each ring on the crests of the elastomer body is preferably formed from a non-metallic material, thus, reducing the friction between the rings and the inside diameter of such tube or receptacle. Moreover, each ring is configured to inhibit creation of air pockets between the axially disposed rings as the opposed ends of the spring move toward each other during a shock absorbing sequence.

In a preferred form of the invention, the elastomeric material used to form the spring body is a copolyester elastomer having a ratio of plastic strain to elastic strain greater than 1.5 to 1. The configuration of the spring body can be easily and readily altered to effect performance of the spring. That is, and depending upon the desired spring characteristics, the elastomeric spring body can be either solid between opposed ends thereof or it can be provided with a generally centralized bore opening to the opposite ends of the spring body.

According to another form, the compressible shock attenuating apparatus of the present invention includes a single tube of copolyester polymer elastomer having opposed ends and configured with a series of adjacent annular crest and roots between the opposed ends. The crests on the elastomer tube have substantially equal predetermined diameters. Upon axial compression, the configuration of the tube collapses upon itself thereby maintaining the predetermined crest diameters of the elastomer tube relatively constant. Each crest of the tube has a closed annular ring fixed thereabout. The rings about the crests of said tube define a predetermined outer diameter of the compressible shock attenuating apparatus and facilitate axial sliding movements of and inhibit snaking movements of the elastomer tube within the elongated member accommodating the elastomeric tube.

Each ring on the compressible shock attenuating apparatus is preferably formed as an integral part of the elastomeric tube and is thereby limited from axial movement along the length of the elastomeric tube. Preferably, each ring is formed from a non-metallic material to enhance the ability of the elastomeric tube to axially move within the hollow member in which it is housed in response to axial loading thereof Moreover, each ring is preferably provided with one or more passages allowing air to move therepast when the opposed ends of the attenuating apparatus are brought closer to each other.

In this form of the invention, a portion of the elastomeric tube axially disposed between each crest and an axially adjacent root is substantially symmetrical to a portion of the elastomeric tube axially disposed between each root and an axially adjacent crest. Moreover, internal portions the elastomer tube preferably have a molecular structure oriented in at least one direction following compression of the tube by at least 30% of its length thereby overcoming a compression set characteristic of the elastomer while providing a relatively constant spring rate for the attenuating apparatus.

In a most preferred form of the invention, the elastomeric tube is formed from a thermoplastic copolyester material having a ratio of elastic strain to plastic strain greater than 1.5 to 1. The crests of the elastomer tube represent annular bands of increased cross-sectional areas while the roots of the elastomeric tube represent intermediate sections which join the radially enlarged annular bands. Each enlarged annular band on the tubular body has an internal molecular structure oriented in a predetermined fashion during pre-compression of the tubular body. In one form, the internal molecular structure in adjacent enlarged bands on the tubular body are joined to each other by similar internal molecular structure extending between the enlarged bands and lengthwise along the intermediate section.

In still another form of the invention, the elastomeric body of the attenuating apparatus can have a generally centralized bore opening to opposite ends of the elastomeric body to control the compressibility of the apparatus. Such bore can further be utilized to journal and guide an elongated bar extending through the elastomeric body.

It is, therefore, an object of this invention to provide a new design and construction of an shock attenuating apparatus including an elongated elastomeric body having a series of closed rings extending about the periphery thereof to define the outer diameter of the apparatus, with the rings enhancing axial movements of and inhibiting snaking of the apparatus within a hollow tube or receptacle in response to axial loads or impacts being imparted to the apparatus.

Another object of the present invention is to provide a new design and construction of a shock attenuating apparatus utilizing an elongated elastomeric body having axially spaced bands of increased cross-sectional area along the length thereof in conjunction with a plurality of closed annular rings extending circumferentially about such annular bands to restrict lateral expansion of the annular bands when the apparatus is compressed and to prevent twisting and snaking of the elongated elastomeric body within a receptacle with which the apparatus is arranged in operative combination.

It is also an object of this invention to provide a new design and construction of a shock attenuating apparatus including a one-piece elastomeric body configured with axially spaced annular crests and roots between opposed ends thereof which provide axially spaced hour-glass like configurations extending along the length of the elastomeric body, and with each crest on the elongated body having a closed annular ring extending about a periphery thereof to facilitate axial sliding movements of the apparatus within a tube or receptacle with which the apparatus is arranged in operative combination, and wherein the hour-glass configurations along the length of the elongated body, in conjunction with the annular rings, readily permitting compression of the elongated body upon itself while maintaining the diameter of the crests substantially constant.

A still further object of the present invention is to provide a new design and construction for a shock absorbing apparatus including an elongated elastomeric one-piece body configured with axially spaced annular bands of increased cross-sectional which are joined to each other through intermediate sections between opposed ends of the body, with each increased cross-sectional area on the elongated body having a closed annular ring extending about a periphery thereof to facilitate axial sliding movements of the apparatus within a tube or receptacle with which the apparatus is arranged in operative combination, and wherein upon compression of the elongated body more than 30% of its overall length, adjacent bands of increased cross-sectional areas have an interior molecular structure oriented in a predetermined fashion to eliminate compression set characteristics of the elastomer and with the internal molecular structure in the adjacent increased cross-sectional areas being joined by similar internal molecular structure extending lengthwise through the intermediate section joining the axially adjacent bands of increased cross-section areas.

A still further object of the present invention is to provide a new design and construction of a compressive elastomeric spring including an elongated elastomeric body having a series of undulating hour-glass configurations comprised of adjacent annular crests and roots between opposed ends of the spring, with non-metallic closed rings arranged about the crests of the hour-glass configurations to promote axial movements of the spring within a tube or receptacle, and wherein a generally centralized bore extends through and opens to opposed ends of the spring for accommodating a guide rod or otherwise influencing the spring rate of the elastomeric spring.

It is another object of the present invention to provide a new design and simplified construction for an elongated thermoplastic elastomeric spring having a series of adjacent annular bands of increased cross-sectional configurations along the length thereof, and with annular closed rings disposed about and connected to the crests to enhance sliding movements of the spring within a tube or receptacle in a cost efficient and effective manner.

These and other objects, aims and advantages of the present invention will become readily apparent from the following detailed description, the appended claims, and the following drawings.

DETAILED DESCRIPTION OF THE DRAWINGS

DETAILED DESCRIPTION OF THE PRESENT INVENTION

While the present invention is susceptible of embodiment in multiple forms, there is shown in the drawings and will hereinafter described preferred embodiments of the present invention with the understanding the present disclosure is to be considered as setting forth exemplifications of the invention which are not intended to limit the invention to the specific embodiments illustrated and described.

Figure 1:
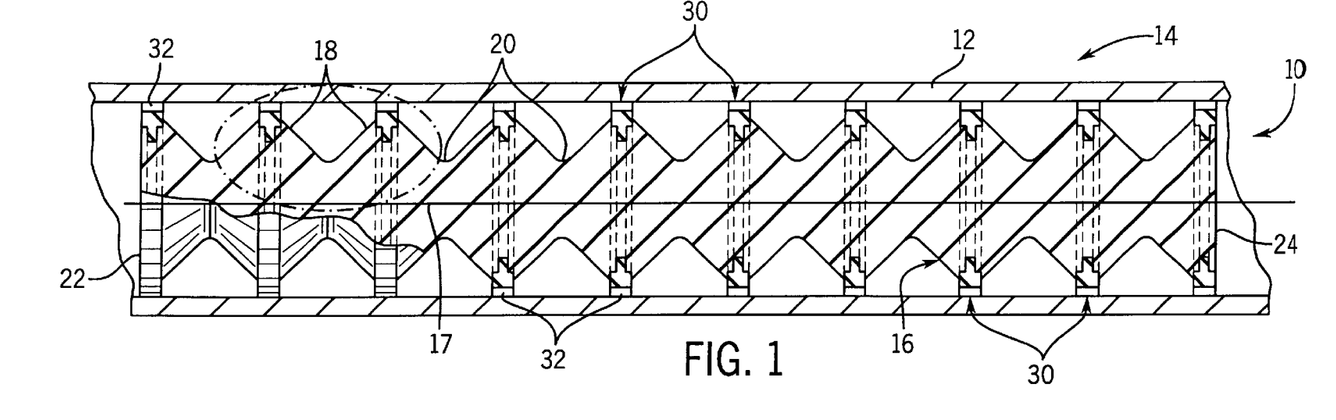
FIG. 1 is a side elevational view of one form of a shock attenuating apparatus according to the present invention illustrated in a tubular member, such as a part of a front suspension system for a bicycle, and shown partly in section to illustrate various internal features of the apparatus.

Referring now to the drawings, wherein like reference numerals indicate like parts throughout the several views, there is illustrated in FIG. 1 a compressible shock attenuating apparatus 10 illustrated in combination with a hollow body member 12 of a pedal powered or motor powered land or water surface vehicle and exercising equipment. As will be appreciated by those skilled in the art, and as illustrated, the apparatus 10 of the present invention slidably fits axially within an inside diameter or configuration of the hollow body member 12. In the illustrated form of the invention, the apparatus 10 and body member 12 form part of a telescoping assembly 14 which utilizes the apparatus 10 of the present invention to reduce or attenuate shock or impacts between the parts of the telescoping assembly 14 thereby providing a smoother ride for the user of such equipment.

In the form of the invention illustrated in FIG. 1, the shock attenuating apparatus 10 includes a single elongated tube or member 16 of elastomer material. Preferably, the elastomer used to form tube 16 is a thermoplastic copolyester polymer material marketed and sold by DuPont & Co. under the tradename HYTREL. The tubular member 16 has a preselected axial length and a major or longitudinal axis 17 extending generally coaxial with the longitudinal axis of the body member 12 which receives the tubular member 16.

Figure 2:
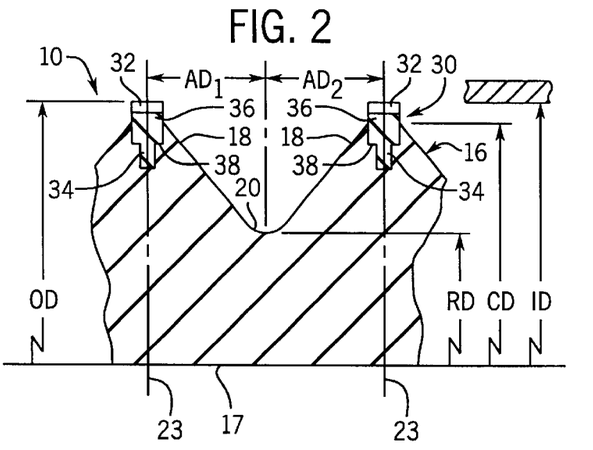
FIG. 2 is an enlarged cross-sectional view of that area of the apparatus encircled in FIG. 1.

In the form of the invention illustrated in FIGS. 1 and 2, the elongated tube 16 is configured as solid with a series of axially adjacent crests 18 and roots 20 between opposed ends 22 and 24 of tube 16. That is, the crest areas 18 on the elongated tube 16 are formed as bands of increased cross-sectional area, with the roots 22 defining intermediate areas which join adjacent increased cross-sectional areas. As shown FIG. 2, each crest 18 has a major axis, such as 23, extending generally normal or perpendicular to the major axis 17 of the elongated tube 16.

In the illustrated form, and as illustrated in FIG. 2, all the crests 18 on the elongated body member 16 have substantially similar outside or crest diameters CD and all the roots 20 have substantially similar root diameters RD. In effect, the periphery of the crests 18 on member 16 cumulatively define a sidewall diameter for the tubular member 16. Of course, the sidewall diameter for the tubular member 16 is less than the inside diameter ID of the body member 12 into which the apparatus 10 of the present invention is axially inserted to allow for axial movements of the tube 16 therewithin.

In the illustrated form of the invention, and as shown in FIG. 2, the elastomeric member 16 is configured with a predetermined axial distance $AD_1$ between an adjacent crest 18 and root 20. The elastomeric member 16 is furthermore configured with a predetermined axial distance $AD_2$ between an adjacent root 20 and crest 18. Preferably, the predetermined axial distances $AD_1$ and $AD_2$ are generally equal to each to provide a generally symmetrical configuration to each band of increased cross-section relative to each axis 23.

The shock attenuating apparatus 10 of the present invention furthermore includes a series of closed annular rings 30 fitted about each crest 20 of the elastomeric member 16 to define a predetermined outer diameter OD for the compressible shock attenuating apparatus 10 of the present invention. The purpose of the rings 30 is to promote axial movements of member 16 within while inhibiting twisting or snaking of the tube 16 within the elongated member 12. As will be appreciated, the rings 30 have a predetermined outside diameter OD equal to or slightly less than the ID of the body member 12 which accommodates the attenuating apparatus 10 of the present invention. As such, the outside diameter of the rings 30 bear against the inside diameter of the body member 12 to provide guidance while the elastomeric portion 16 of the energy attenuating apparatus 10 provides the spring forces and energy absorption.

Each ring 30 is preferably formed from a non-metallic material to reduce the frictional characteristics between each ring 30 and the inside surface of body member 12. In a most preferred form of the invention, each ring 30 is formed from a plastic or nylon material typically sold and marketed under the tradename Delrin. Suffice it to say, each ring 30 is formed from a material having good wear and strength characteristics.

Figure 3:
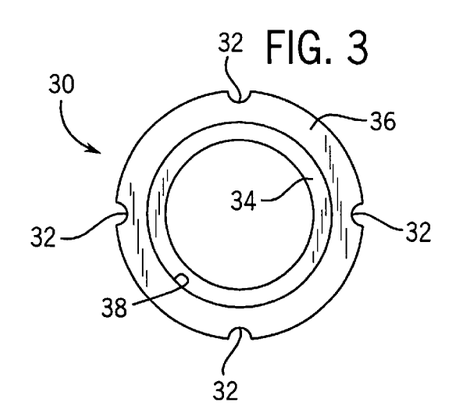
FIG. 3 is a plan view of a component of the shock attenuating apparatus of the present invention.

Turning to FIG. 3, the outside diameter or periphery of each ring 30 is formed with a series of reliefs or notches 32. The purpose of the notches or reliefs 32 is to allow air to move past the rings 30 when the elastomeric member 16 is compressed to absorb energy. That is, the notches 32 inhibit the compression of air in pockets disposed between adjacent rings 30 upon compression of the elastomeric member 16. As will be appreciated from an understanding of their purpose, the notches or reliefs 32 on the rings 30 can take any suitable shape and be of any suitable size.

In a preferred form of the invention, the rings 30 are fixedly connected or joined to the elastomeric tube 16 thereby inhibiting the rings 30 from axially shifting along the length of the elongated tube 16 in response to axial movements of tube 16 within body member 12. In a most preferred form of the invention, the rings 30 are integrally molded onto the elongated tubular member 16.

As shown in FIG. 3, each annular ring 30 is preferably formed with a reduced circular inner section 34 concentrically arranged relative to an outer section 36. As schematically illustrated in FIG. 2, the inner section 34 of each ring 30 has a reduced width as compared to the outer section 36. Accordingly, an annular step 38 is provided between the inner and outer sections 34 and 36, respectively. When formed into combination with the elastomeric tube 16, the inner section 34 maintains each ring 30 in fixed relation relative to the elastomeric tube 30 especially in the area of the crests 18 adjacent opposed ends 22, 24 of the elastomeric member or tube 16. As will be appreciated by those skilled in the art, configurations other than the concentric inner ring 34, such as a series of radially separated ears or tabs integrally formed with and inwardly projecting toward the center of the ring 30, would equally suffice for connecting each ring 30 to the elastomeric member or tube 16.

The elastomeric tube 16, in accordance with the desired objective, can be manufactured by machining, molding or other suitable methods. Preferably, the rings 30 are positioned in a mold and thereafter, the elastomeric material forming the elastomeric member 16 is molded thereto. Of course, the number and location of the annular bands 18 of increased cross-section, the outside diameter, along with the length of the elastomeric tube 16 are all factors which influence and control the spring rate of the compressible attenuating apparatus 10 of the present invention.

According to a preferred form of the invention, a single or unitary elastomeric member 16 of a preselected axial length, with the rings 30 connected to and fitted about the outer diameters or crests 18 of the bands of increased cross-sectional area is subjected to axial compression. The axial compression of the elastomeric member 16 is preferably accomplished in a press but any other suitable apparatus would equally suffice without detracting or departing from the spirit and scope of the present invention. The degree of compression may vary depending upon the material used to form the tube. When a HYTREL thermoplastic elastomer material is used, however, the axial compression must be at least 30% of the initial axial length of the tube 16 to overcome the compression set characteristics of a HYTREL material and to orientate the internal molecular structure.

Figure 4:
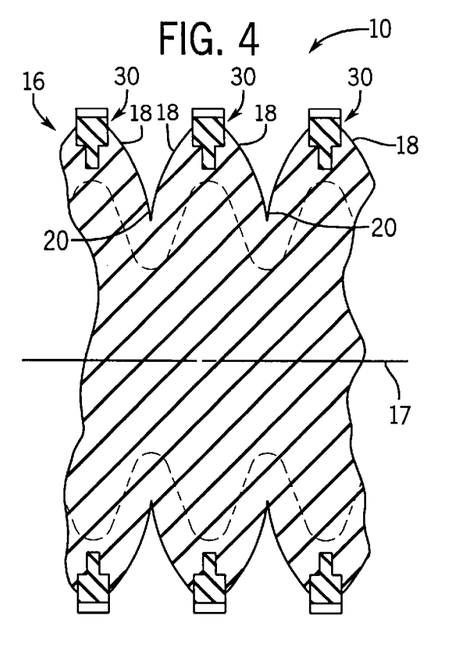
FIG. 4 is an enlarged fragmentary sectional view of the attenuating apparatus illustrated in FIG. 1 in a further degree of axial compression and schematically illustrating in dash lines internal molecular structure oriented in a predetermined direction.

Axial compression of the elastomeric member 16 not only permanently changes the axial length of the elastomeric member 16 but also changes the physical characteristics of certain internal areas of the spring 16. As schematically illustrated in dash lines in FIG. 4, sufficient compression of the elastomeric member 16 will orientate the internal molecular structure in the increased annular band areas of the tube along with an internal lengthwise section extending through the intermediate areas joining the increased cross-sectional areas on the tube 16. As will be appreciated by those skilled in the art, changing the internal molecular structure of elastomeric member 16 effects the abilities of the compressible shock attenuating apparatus 10 to absorb and continually rebound in a predetermined fashion from the impact of energy applied thereto. After the elastomeric member 16 has been axially precompressed in the desired manner, the axial compressive force is removed therefrom, thus, allowing the elastomeric member 16 to take on the general shape schematically represented in FIG. 4.

The end-to-end axially spaced hourglass designs or configurations defined by the crests 18 and roots 20 along the outer circumference and length of the elongated elastomeric member 16 yields a significant advantage to the present invention. The configuration of the elastomeric member 16 is distortable upon compression of member 16 while the crests 18 remain substantially constant in diameter. As such, the elastomeric spring 10 of the present invention collapses upon itself during axial compression without any significant increase in the outer diameter thereof. That is, as the elongated member 16 is compressed in response to an axial load or force being applied thereto, the circumference of the axially spaced annular bands of increased cross-sectional area on the elongated member 16 remain substantially constant. As will be appreciated by those skilled in the art, encircling the periphery of each crest 18 or annular band of increased cross-sectional area with a closed ring 30 inhibits the crest diameter from bulging laterally or radially outwardly. As such, and as will be appreciated from FIG. 1, the elastomeric material portion of the spring 10 of the present invention is maintained in radially spaced relation from the inside or internal diameter of the hollow body 12 wherein the spring 10 is axially inserted thereby avoiding stiction and an inadvertent increase in spring rate.

Figure 5:
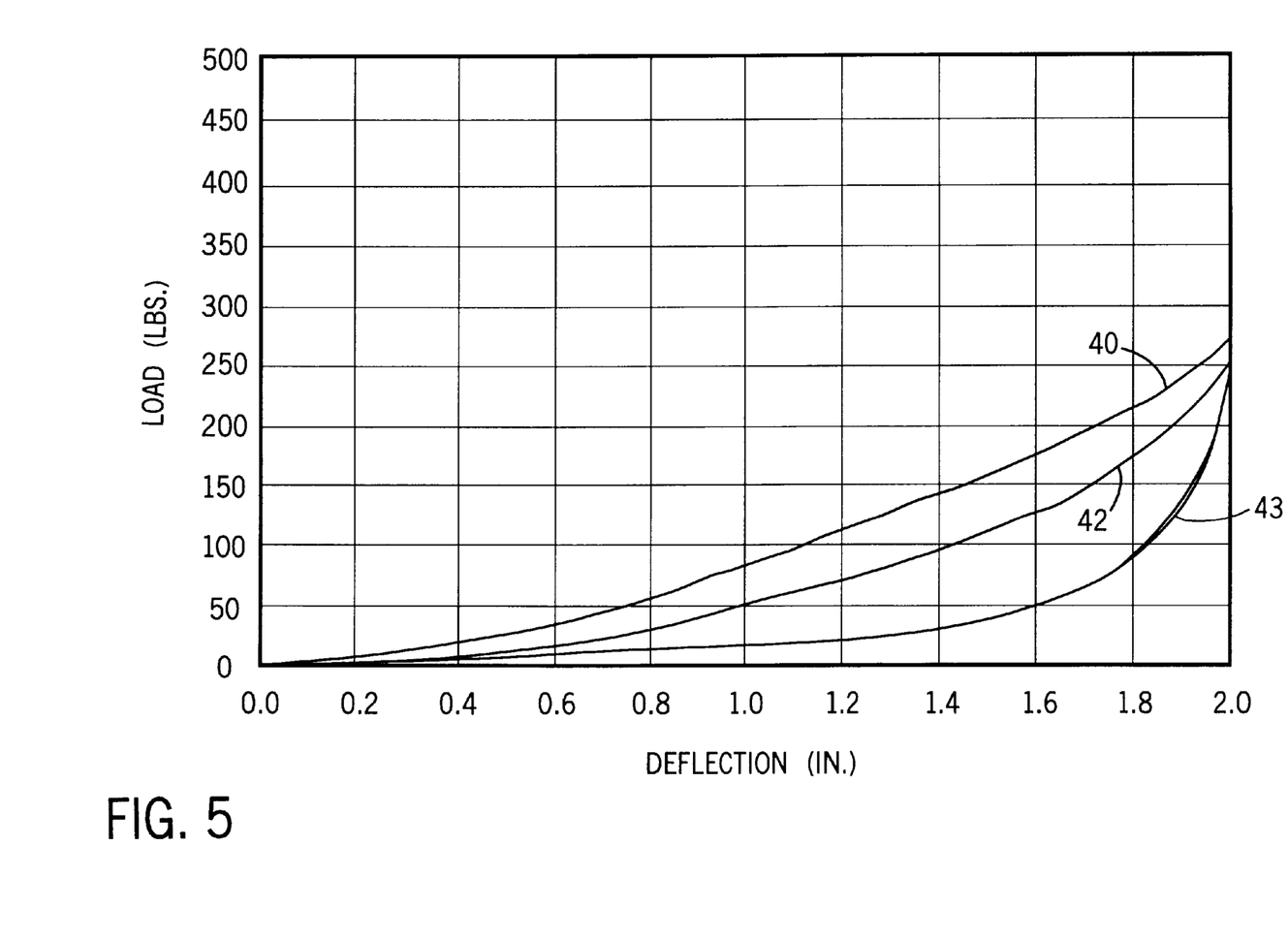
FIG. 5 is an illustrative displacement graph comparing the force displacement of a compressive shock attenuating apparatus according to the present invention.

The operating range of the compressible spring 10 is represented on a force deflection chart schematically illustrated in FIG. 5. Line 40 on the force deflection chart schematically represents the first closure of spring 10. Line 42 on the force deflection chart schematically represents the fourth closure of spring 10. Line 43 on the force deflection chart schematically represents a release curve for the first and fourth closures of the spring 10 after a compression force is removed therefrom.

Figure 6:
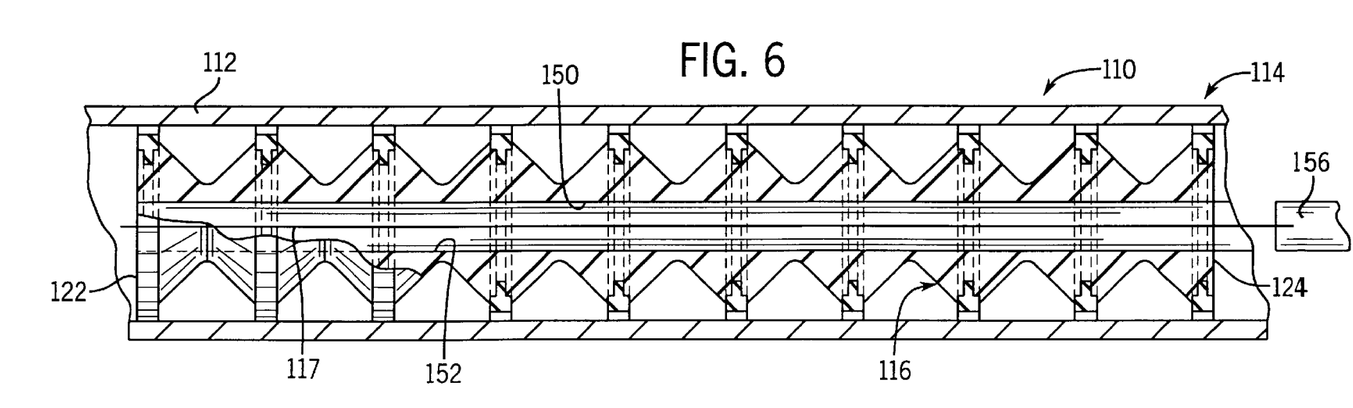
FIG. 6 is an illustration, similar to FIG. 1, showing an alternative form of a shock attenuating apparatus according to the present invention.
Figure 7:
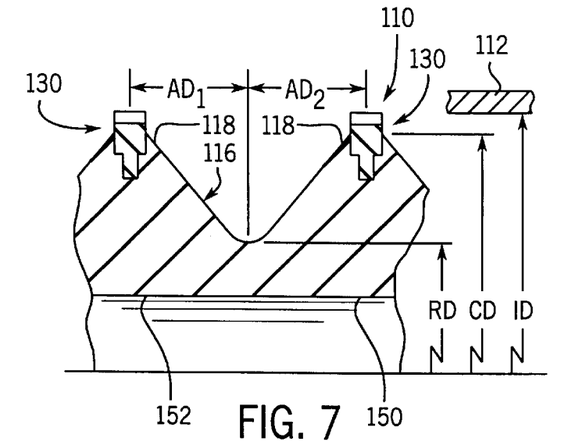
FIG. 7 is a view similar to FIG. 2 illustrating an enlarged fragmentary section of the alternative form of shock attenuating apparatus illustrated in FIG. 6.
Figure 8:
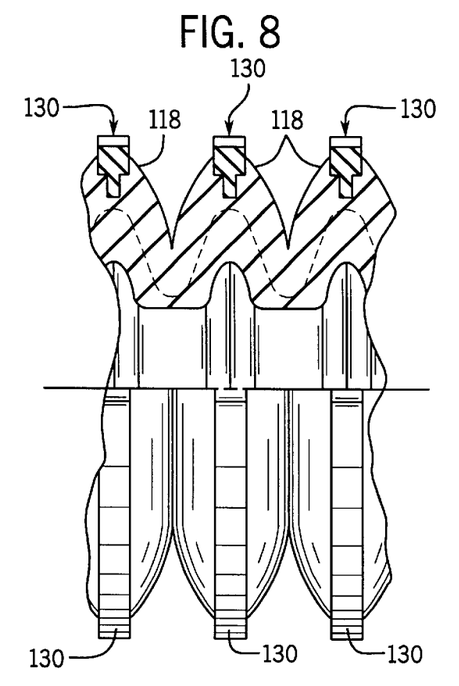
FIG. 8 is similar to FIG. 4 but illustrates an enlarged fragmentary sectional view of the attenuating apparatus illustrated in FIG. 6 in a further degree of axial compression and schematically illustrating, in dash lines, internal molecular structure oriented in a predetermined direction.

Another embodiment of a compressible shock attenuating apparatus is schematically illustrated in FIGS. 6 through 8 and is generally designated therein by reference numeral 110. The shock attenuating apparatus 110 has a substantially identical function to the shock attenuating apparatus 10 described above. The elements of this second embodiment of the shock attenuating apparatus 110 that are identical or functionally analogous to those in the first embodiment are designated by reference numerals identical to those used for the first embodiment with the exception that the second embodiment reference numerals are in the one-hundred series.

In this embodiment of the invention, the elastomeric member 116 is provided with a generally centralized bore or aperture 150 extending generally coaxial with the longitudinal axis 117 of the spring 110. In the illustrated embodiment, the aperture or bore 150 opens to opposite ends 122, 124 of the elastomeric member 116. As will be appreciated by those skilled in the art, and as a function of its size, the bore 150 in the elastomeric member 116 allows for variance of the force deflection curve (FIG. 5). Moreover, the peripheral wall 152 of the bore 150 defines a guide which journals or otherwise lengthwise surrounds a conventional elongated centrally disposed rod 156 forming part of a telescoping assembly 114.

The rings 130, joined and locked about the crests 118 of the elongated elastomeric member 116, are substantially identical to those mentioned above and provide a stiff structure for guiding the spring 110 within the tubular body 112 of the telescoping assembly 114. As will be appreciated, the periphery of the rings 130 combine to define the outer diameter for the spring 110 and bear against the inside surface of the telescoping assembly 114 with which the spring 110 is arranged in cooperative relationship. In addition to enhancing sliding action within the tubular body 112, the rings 130 of the compressible spring 110 substantially eliminates lateral bulging of the elastomeric member 116 into contact with the tubular body 112.

Figure 9:
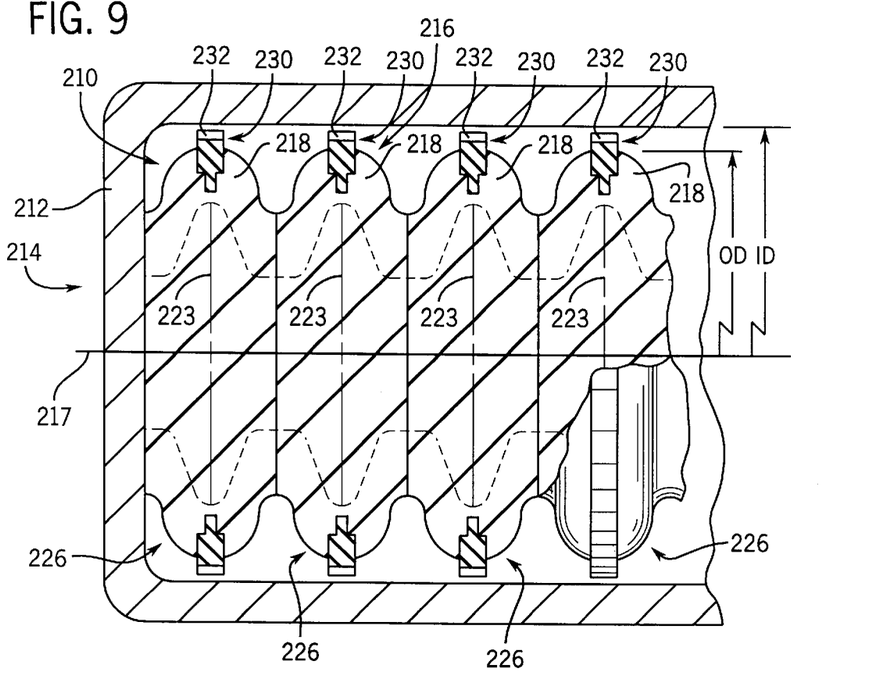
FIG. 9 is a fragmentary sectional view illustrating another alternative form of the present invention.

Another embodiment of a compressible shock attenuating apparatus is schematically illustrated in FIG. 9 and is generally designated therein by reference numeral 210. In this embodiment, the shock attenuating apparatus 210 is arranged in combination with a hollow draft gear housing 212 forming part of a railroad car draft gear 214. Otherwise, the compressible shock attenuating apparatus or spring 210 has a substantially identical function to the shock attenuating apparatus 10 described above. The elements of this third embodiment of the shock attenuating apparatus 210 that are identical or functionally analogous to those in the first embodiment are designated by reference numerals identical to those used for the first embodiment with the exception that the second embodiment reference numerals are in the two-hundred series.

In the form of the invention illustrated in FIG. 9, the shock attenuating apparatus or spring 210 includes an elongated structure 216 comprised of a series of generally toroidally shaped elastomeric pads 226 arranged in axially stacked relation relative to each other and defining an elongated axis 217 for the structure 216. Each elastomeric pad 226 defines a band 218 of increased cross-sectional area extending generally normal or perpendicular to the axis 217 along a major axis, such as 223. In the illustrated form of the invention, all the annular bands of increased cross-section have a substantially identical OD to define a sidewall diameter for the elongated member 216. Of course, the sidewall diameter of member 216 is less than the inside diameter ID of the hollow draft gear housing 212 which accommodates the elongated member 216 for axial sliding movements along the axis 217 in response to axial loads or impacts being placed on the spring 210.

The shock attenuating apparatus 210 furthermore includes a closed annular ring 230 fitted about and fixedly joined to the peripheral crest of each elastomeric pad 226 forming the spring 210 to define a predetermined outer diameter for the compressible shock attenuating apparatus 210. As described above, the rings 230 are sized to proximate the inside diameter of the housing 212. As such, the outside periphery of the rings 230 bear against the inside surface of the housing 212 thereby providing guidance and preventing snaking of the elastomeric body 216 when the ends of the compressible spring 210 are moved toward each other in response to an axial load or impact being imparted to the spring 210. As described above, each ring 230 is suitably configured, as with slots 232 or the like on the periphery thereof, to allow air to move therepast when the spring 210 is compressed to absorb energy.

As described above, the configuration of the pads 226 allows the elastomeric body 216 to collapse upon itself when the spring 210 absorbs energy while each pad 226 maintains a substantially constant outside diameter. As will be appreciated by those skilled in the art, encircling or encapsulating the outside diameter of each area of increased cross-section with a closed annular ring 230 likewise inhibits the crest diameter of each pad 216 from bulging laterally outwardly when the axial length of the spring 210 is compressed from an axial load or impact being imparted thereto. As such, the elastomeric material portion of the spring 210 is maintained in axially spaced relation from the inside or internal surface of the housing 212 when the spring 210 is axially compressed thereby avoiding stiction and an inadvertent increase in spring rate.

In the form of the invention illustrated in FIG. 9, each pad 226 is preferably formed from a HYTREL thermoplastic polyester elastomer material which is processed to incorporate spring-like characteristics in a manner described according to the advantageous teaching set forth in either U.S. Pat. Nos. 4,198,037 and 4,566,678 to David G. Anderson; with the applicable portions of these references being incorporated herein by reference. Suffice it to say, sufficient axial compression of the pads 226, preferably prior to their incorporation within the housing 212, will orientate the internal molecular structure at least in the increased annular band area as schematically illustrated in dash lines in FIG. 9. As will be appreciated by those skilled in the art, changing the internal molecular structure of the elastomeric pads 226 effects the ability of the compressible spring 210 to absorb and continually rebound in a predetermined fashion from the impact of energy applied thereto.

Figure 10:
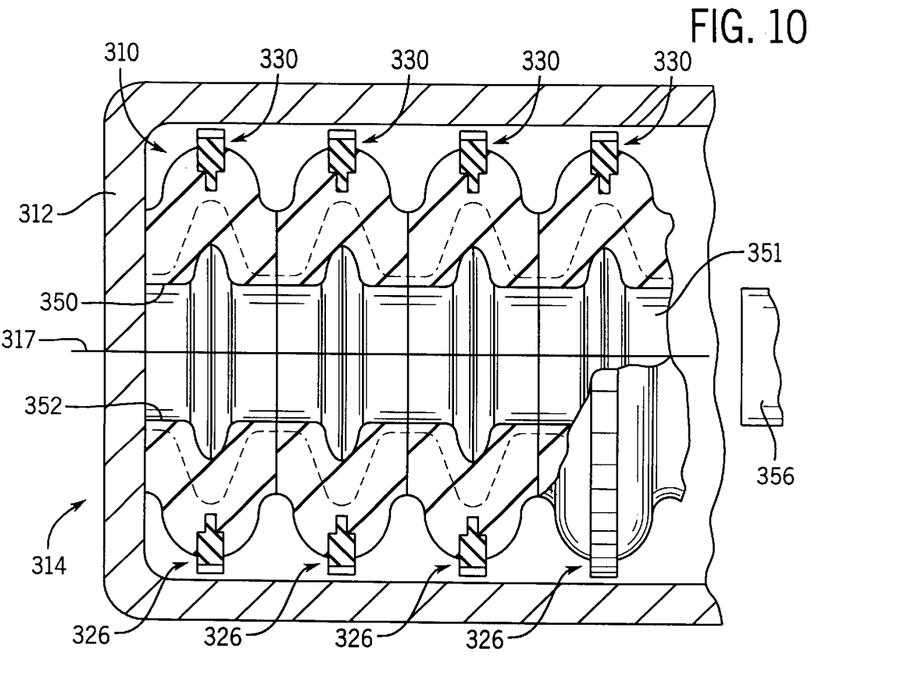
FIG. 10 is a view similar to FIG. 9 illustrating still another alternative form of the present invention.

Another embodiment of a compressible spring for a railroad car draft gear is schematically illustrated in FIG. 10 and is generally designated therein by reference numeral 310. The shock attenuating apparatus 310 has a substantially identical function to the shock attenuating apparatus 210 described above. The elements of this fourth embodiment of the shock attenuating apparatus 310 that are identical or functionally analogous to those in the third embodiment are designated by reference numerals identical to those used for the third embodiment with the exception that the fourth embodiment reference numerals are in the three-hundred series.

In this embodiment of the invention, each elastomeric pad 326 forming the elongated elastomeric member or body 316 is provided with a generally centralized bore or aperture 350 extending generally coaxial with the longitudinal axis 317 of the spring 310. As such, the bores 350 in the pads 326 combine to define a continuous passage or aperture 351 which, in the illustrated embodiment, opens to opposite ends of the elastomeric member 316. As will be appreciated by those skilled in the art, and as a function of its size, the bore 351 in the elastomeric member 316 allows for variance of the force deflection curve developed by the spring 310. Moreover, the peripheral wall 352 of the bore 351 defines a guide which journals or otherwise lengthwise surrounds a conventional elongated centrally disposed rod 356 used to guide the pads 326 as they axially shift in response to axial compression and rebounding movements within the housing 312.

The rings 330, joined and locked about the crests 318 of the elongated elastomeric member 316, are substantially identical to those mentioned above and provide a stiff structure for guiding the spring 310 within the housing 312 of the draft gear 314. As will be appreciated, the periphery of the rings 330 combine to define the outer diameter for the spring 310 and bear against the inside surface of the draft gear with which the spring 310 is arranged in cooperative relationship. In addition to enhancing sliding action within the housing 312, the rings 330 of the compressible spring 310 substantially eliminates lateral bulging of the elastomeric member 316 into contact with the housing 312.

Regardless of which particular design is selected, the shock absorbing apparatus of the present invention has multiple advantageous features. That is, the elastomeric spring of the present invention is capable of absorbing energy over a predetermined effective range while maintaining a substantially constant outside diameter for the spring. With the present invention, the configuration of the elastomeric spring allows the spring to collapse upon itself when deformed as a result of spring compression while maintaining a substantially constant circumference or outside diameter.

As will be appreciated by those skilled in the art, the closed annular rings disposed about the peripheral crests of the annular bands of increased cross-section furthermore yield several distinct advantages to the present invention. The closed annular rings disposed about the peripheral crests of the annular bands of increased cross-section serve to maintain the outside diameter of the spring substantially constant regardless of the level of compression of the spring. Furthermore, the annular rings fitted about and joined to the periphery of the crests on the elongated elastomeric body of the spring combine with each other during compression and expansion of the spring to provide a stiff structure for guiding the spring within the receptacle in which it is housed or accommodated while inhibiting snaking of the spring within the housing or receptacle which accommodates the spring. Of course, and when the spring is placed under load, the annular rings serve to substantially eliminate spring bulge in lateral or radially outward direction which could otherwise cause stiction and an increased spring rate. Advantageously, providing the rings about the crests of the elastomeric spring can be accomplished economically with superior operating characteristics being generated as a result of their presence in combination with the elastomeric spring.

From the foregoing it will, be observed that numerous modifications and variations can be effected without departing or detracting from the true spirit and scope of the novel concept of the present invention.. It will be appreciated that the present disclosure is intended to set forth exemplifications of the invention which are not intended to limit the invention to the specific embodiments illustrated. The disclosure is intended to cover by the appended claims all such modifications and variations as fall within the spirit and scope of the novel concept of the present invention.

What is claimed is:

1. A compressible shock attenuating apparatus for axial insertion within an elongated hollow member, said shock attenuating apparatus comprising:

a single tube of copolyester polymer elastomer having opposed ends and configured with a series of adjacent annular crest and roots between said ends, said crests having substantially equal predetermined diameters, and wherein the configuration of said tube permitting axial compression thereof while maintaining the predetermined crest diameters of said tube to remain relatively constant; and with each crest of said tube having a closed annular non-metallic ring fixed thereabout, with the rings about the crests of said tube defining a predetermined outer diameter of said apparatus and which are sized relative to an inner diameter of said hollow member so as to facilitate axial sliding movements of and inhibit snaking movements of said tube within said elongated member, with an inner section of each ring being specifically configured to maintain each ring in fixed relation relative to said tube during repeated compression/expansion of said tube, and wherein each ring is configured with a series of reliefs on a periphery thereof for permitting air to move therepast during compression/expansion of said tube.

2. The compressible shock attenuating apparatus according to claim 1 wherein said tube of copolyester polymer elastomer has a ratio of plastic to elastic strain greater than 1.5 to 1.

3. The compressible shock attenuating apparatus according to claim 1 wherein a portion of said tube axially disposed between each crest and an axially adjacent root is substantially symmetrical to a portion of said tube axially disposed between each root and an axially adjacent crest.

4. The compressible shock attenuating apparatus according to claim 1 wherein lengthwise portions said elastomer tube have a molecular structure oriented in at least one direction following compression of said tube by at least 30% of its length thereby overcoming a compression set characteristic of the elastomer.

5. The compressible shock attenuating apparatus according to claim 1 wherein said tube defines a bore extending lengthwise through a generally centralized portion said tube and opening to the opposed ends thereof.

6. A compressible shock attenuating apparatus for axial insertion within an elongated hollow receptacle having a predetermined inner diameter, said shock attenuating apparatus comprising:

an elongated one-piece copolyester polymer elastomer member defining a major axis and having opposed ends, said one-piece member being configured with a series of substantially identical axially spaced annular bands of increased cross-sectional area between said ends extending generally perpendicular to said major axis, with a periphery of said increased cross-sectional areas of said bands defining a sidewall for said member, and wherein the configuration of said one-piece member allowing for axial compression while maintaining the circumference of said sidewall to remain substantially constant; and with each annular band having a closed annular non-metallic ring fixed and extending thereabout to define a predetermined outer diameter for said apparatus, with the predetermined outer diameter of said apparatus being sized to the inner diameter of said receptacle whereby said rings promote axial movements and inhibit snaking movements of said apparatus within said receptacle, with an inner section of each annular ring being specifically configured to maintain each ring in fixed relation relative to each annular band during repeated compression/expansion of said member, and wherein each ring is configured with a series of reliefs on a periphery thereof for permitting air to move therepast during compression/expansion of said elastomer member.

7. The compressible shock attenuating apparatus according to claim 6 wherein said elastomer member is formed from an elastomeric material having a ratio of plastic to elastic strain greater than 1.5 to 1.

8. The compressible shock attenuating apparatus according to claim 7 wherein lengthwise portions said elastomer member have a molecular structure oriented in at least one direction following compression of said member by at least 30% of its length thereby overcoming a compression set characteristic of the elastomer while providing a relatively constant spring rate for said attenuating apparatus.

9. The compressible shock attenuating apparatus according to claim 6 wherein said elastomer member defines a bore extending lengthwise through a generally centralized portion said member and opening to the opposed ends thereof.

10. The compressible shock attenuating apparatus according to claim 9 further including an elongated guide passing through the bore in said member for guiding said member during axial compression thereof.

11. A compressible shock attenuating apparatus adapted for axial insertion within an elongated hollow receptacle having a predetermined inner diameter, said shock attenuating apparatus comprising:

an elongated one-piece tubular body formed from copolyester polymer elastomer having a pair of mutually parallel and axially spaced ends and configured with a plurality of axially spaced annular bands of increased cross-sectional area between said ends to define an outer diameter for said tubular body, with said annular bands being joined to each other by intermediate sections of lesser diameter than said outer diameter of said tubular body and which are distortable upon movement of said ends toward each other such that as said tubular body is compressed the outer diameter of said body remains substantially constant; and with each annular band having a closed annular non-metal ring fixed and extending thereabout to promote maintaining the outer diameter of said tubular body substantially constant during compression of said tubular body while defining a predetermined outer diameter for said apparatus, with the predetermined outer diameter of said apparatus being greater than the outer diameter of said tubular body and is sized to the inner diameter of said receptacle whereby said rings promote axial movements and inhibit snaking movements of said apparatus within said receptacle, with an inner section of each annular ring being annularly stepwise configured to maintain each ring in fixed relation relative to each annular band during repeated compression/expansion of said tubular body and wherein each ring is configured with a series of reliefs on a periphery thereof for permitting air to move therepast during compression/expansion of said tubular body.

12. The compressible shock attenuating apparatus according to claim 11 wherein the axially spaced annular bands and intermediate sections provide an hourglass configuration to said tubular body.

13. The compressible shock attenuating apparatus according to claim 11 wherein said tubular body is formed from an elastomeric material having a ratio of plastic to elastic strain greater than 1.5 to 1.

14. The compressible shock attenuating apparatus according to claim 11 wherein lengthwise portions said tubular body have a molecular structure oriented in at least one direction following compression of said body by at least 30% of its length thereby overcoming a compression set characteristic of the elastomer while providing a relatively constant spring rate for said attenuating apparatus.

15. The compressible shock attenuating apparatus according to claim 11 wherein each annular band of increased cross-sectional area on said tubular body has an internal molecular structure oriented in a predetermined fashion during precompression of said tubular body to eliminate compression set characteristics of the elastomer.

16. The compressible shock attenuating apparatus according to claim 15 wherein the internal molecular structure in adjacent annular bands of increased cross-sectional areas are joined to each other by similar internal molecular structure extending axially along the intermediate section joining said adjacent bands of increased cross-sectional area.

17. The compressible shock attenuating apparatus according to claim 11 wherein said tubular body defines a bore extending lengthwise through a generally centralized portion said body and opening to the opposed ends thereof.

18. The compressible shock attenuating apparatus according to claim 17 further including an elongated guide passing through the bore in said body for guiding said member during axial compression thereof.

19. A compressible spring for axial insertion within an elongated hollow receptacle having a predetermined inner diameter, said compressible spring comprising:

a copolyester polymer elastomer body having an outer diameter and a pair of axially spaced ends between a length thereof, said body having a series of substantially equal annular crests axially disposed relative to each other between said ends, a periphery of said crests defining an outer diameter for said body, and wherein said body is distortable such that as said elastomer body is compressed the length diminishes while the outer diameter of said body remains substantially constant; and a closed annular non-metal ring fixed and extending about each crest of said body to promote maintaining the outer diameter of said body substantially constant during spring compression while defining a predetermined outer diameter for said spring, with the predetermined outer diameter of said spring being greater than the outer diameter of said body and is sized to the inner diameter of said receptacle whereby said rings promote axial movements and inhibit snaking movements of said spring within said receptacle, with an inner section of each annular ring being annularly configured to maintain each ring in fixed relation relative to each annular band during repeated compression/expansion of said tubular body, and wherein each ring is configured with a series of reliefs on a periphery thereof for permitting air to move therepast during compression/expansion of said tubular body.

20. The compressible spring according to claim 19 wherein said elastomer body is comprised of a unitary elongated tubular member having a generally centralized bore opening to opposite ends thereof.

21. The compressible spring according to claim 19 wherein tubular body is formed from an elastomeric material having a ratio of plastic to elastic strain greater than 1.5 to 1.

22. The compressible spring according to claim 19 wherein portions said tubular body extending radially outwardly from an elongated axis defined by said body in the area of said annular crests have a molecular structure oriented in at least one direction following compression of said body by at least 30% of its length thereby overcoming a compression set characteristic of the elastomer while providing a relatively constant spring rate for said attenuating apparatus.

23. The compressible shock attenuating apparatus according to claim 19 wherein said elastomer body defines a bore extending lengthwise through a generally centralized portion and opening to the opposed ends thereof.

24. The compressible shock attenuating apparatus according to claim 23 further including an elongated guide passing through the bore in said body for guiding said member during axial compression thereof.

* * * * *